United States Patent [19]

Borlan

[11] 4,268,042
[45] May 19, 1981

[54] FLEXIBLE BELLOWS PISTON SEAL

[76] Inventor: Albert G. Borlan, 3730 Ginger Way, Oceanside, Calif. 92054

[21] Appl. No.: 147,926

[22] Filed: May 8, 1980

[51] Int. Cl.³ .............................................. F16J 3/00
[52] U.S. Cl. .......................................... 277/1; 277/12; 277/200; 277/212 FB; 92/36; 92/44; 92/178
[58] Field of Search ...................... 92/34, 36, 178, 44; 277/12, 200, 1, 212 FB

[56] References Cited

U.S. PATENT DOCUMENTS

| 1,757,997 | 5/1930 | Greenwald | 92/34 |
| 2,021,156 | 11/1935 | Smith | 92/44 X |
| 2,712,483 | 7/1955 | Ciaccia | 92/178 |
| 2,791,372 | 5/1957 | Abbatiello | 92/34 |
| 2,915,046 | 12/1959 | Larsen et al. | 92/178 X |
| 3,008,294 | 11/1961 | Carlson | 92/36 X |

FOREIGN PATENT DOCUMENTS

| 971530 | 7/1975 | Canada | 277/212 FB |
| 1952065 | 4/1971 | Fed. Rep. of Germany | 92/44 |
| 2333432 | 1/1974 | Fed. Rep. of Germany | 277/212 FB |
| 2901138 | 7/1979 | Fed. Rep. of Germany | 277/212 FB |
| 833244 | 7/1938 | France | 92/44 |
| 1112743 | 11/1955 | France | 92/34 |

Primary Examiner—Robert S. Ward, Jr.
Attorney, Agent, or Firm—Ralph S. Branscomb

[57] ABSTRACT

Means and method are provided for utilizing a piston and cylinder combination eliminating the usual sealing and oil rings and their accompanying friction and replacing them with ball bearings which in the principal embodiment are captured in splitring cages which are snapped into the existing grooves of the piston. Having thus lost the sealing ability of the piston, an accordion-type diaphram is utilized in the top of the cylinder to define the compression or combustion chamber.

7 Claims, 4 Drawing Figures

FLEXIBLE BELLOWS PISTON SEAL

BACKGROUND OF THE INVENTION

One of the major causes of wear in an engine is the sliding friction between the piston rings and the cylinder walls. Wearing of the rings against the walls result in the notorious oil burning common in older cars, and replacing the rings is a major job. Additionally, one of the major inefficiencies in an engine results from the energy lost due to sliding friction between the piston rings and the cylinder walls. Up to 35% of an engine's power is consumed in overcoming internal friction, primarily that which occurs between the piston rings and cylinder walls.

Numerous engines and pumps have been developed avoiding the requirement that the piston have a sliding bearing relation with the cylinder wall by utilizing various types of accordions and diaphrams. These may be found in the following U.S. Pat. Nos.: 1,180,947; 1,181,802; 2,084,496; 2,376,214; and last, an interesting modern engine is illustrated in U.S. Pat. No. 4,044,728.

Whereas some of the designs disclosed in the above-stated patents may well be worthy engines or pumps, the fact is that they must be specially designed and are not adapted to be created by the conversion of an existing engine or pump. Because of this, it is unlikely that anyone has manufactured any of these devices because of the special parts and the tremendous expense involved in the production of a single unit.

There is a need for a technique for converting existing internal combustion engines as well as various pumps to a non piston-sealing mode with a minimum of expense or specialized parts.

SUMMARY OF THE INVENTION

The present invention fulfills the above-stated need by providing ball bearings, preferable implemented in split ring cages, which can be snapped into the existing piston ring slots or grooves subsequent to their removal to replace the sliding friction of the ring with the rolling friction of the ball bearings. Ordinarily two bearing rings could be utilized, although additional rings could be added provided there are existing grooves.

A special, preferably frustoconical accordion shaped diaphram with a radial flange outwardly directed from its larger end is dropped into the top of the cylinder after the cylinder head is removed, and the cylinder head, engaging the peripheral flange, holds the diaphram in position.

The bottom of the accordion diaphram is a continuous disc which may be fastened in one way or another to the top of the piston, but inasmuch as the forces extant between the diaphram and the piston are always compressive, provided the diaphram has a reasonable degree of rigidity it need not actually be connected at all.

DETAIL DESCRIPTION OF THE PREFERRED EMBODIMENT

Figure 1:
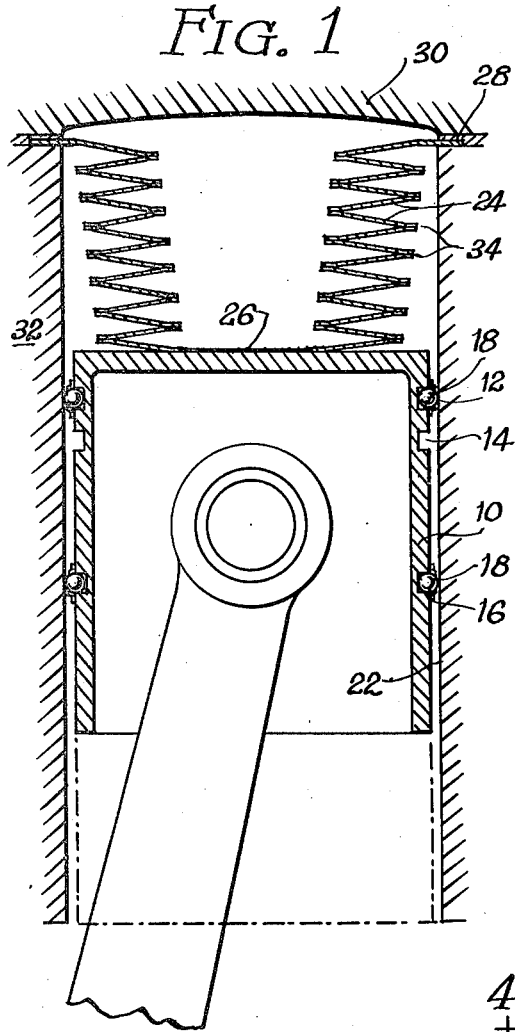
FIG. 1 is a diagrammatic view of a longitudinal section of the device.

The invention incorporates a specially modified piston in a modified cylinder, which could be used as a compressor, a pump, or an engine and will be referred to generally as an engine. FIG. 1 illustrates a traditional piston 10 having two slots or grooves 12 and 14 formally for the seating of piston rings. A third groove 16 is an oil ring seat, and in the two outermost grooves are disposed a plurality of ball bearings 18 which are preferably captured in some type of cage such as the split ring cage 20 to maintain the balls properly spaced when in use and to prevent their spilling when the piston is removed for servicing. Note that the balls are of sufficient diameter to extend out to the interior wall of the cylinder 22.

There is now built in to the piston "blow-by", requiring the incorporation of an accordion diaphram 24. As shown, the sides of the diaphram slope inwardly toward the bottom so that the overall configuration is frustoconical, with a continuous bottom 26 and a radially extending flange 28 which is captured between the cylinder head 30 and the top of the block 32 so that the cup shape accordion is simply dropped into the top of the cylinder and the head subsequently bolted into position.

Figure 2:
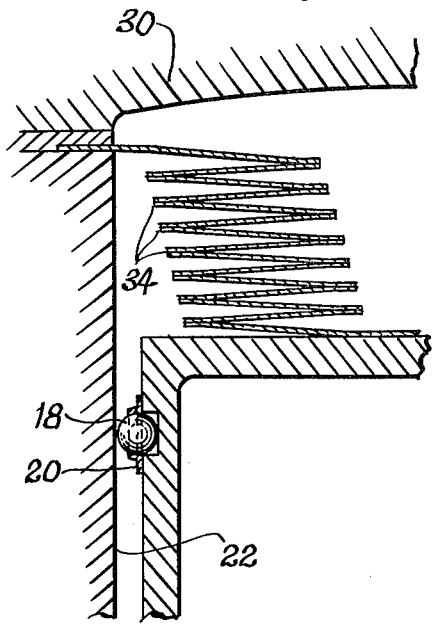
FIG. 2 is a detail of the device of FIG. 1 in partially compressed condition.

Because of the inward sloping of the bottom portions of the diaphram, there is less tendency for the seams to stack one on top of the other and they are more easily displaced out of the way of adjacent seams when stacked, as can be visualized in FIG. 2. Inasmuch as a tough, probably metallic material would need to be used for the accordion, the seams 34 are shown as they would appear if a series of consecutive washers or annulae were bonded together.

Thus an existing engine, pump or compressor can be easily converted to this less frictional implementation by the removal of the pistons from the cylinder block, removal of the rings from the piston, insertion of the ball cages into the piston ring grooves, reinsertion of the piston, removal of the cylinder head, dropping an accordion diaphram into the cylinder, and bolting on the head.

Figure 3:
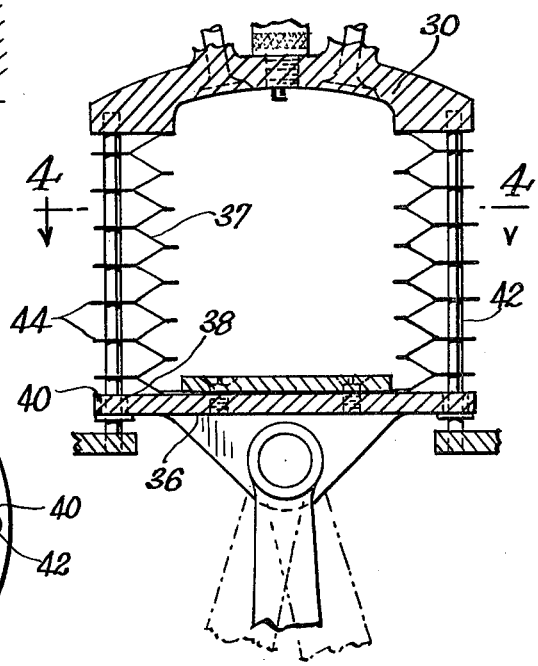
FIG. 3 is a diagrammatic longitudinal section through a modification of the device.
Figure 4:
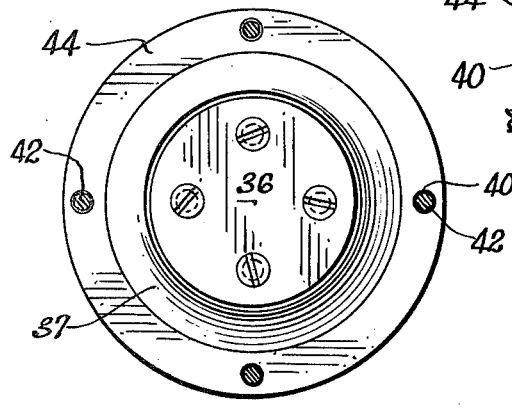
FIG. 4 is a section taken along line 4—4 of FIG. 3.

A slight modification of the above-stated engine structure is shown in FIGS. 3 and 4 wherein a special piston 36 with diaphram 37 has slots or channels 38 defined logitudinally, and within these slots ball bearing races 40 ride up and down on the guide rods 42. In this implementation no cylinder is needed at all, and the outer seams of the accordion may have flanges 44 which are spindled by the rods 42 to maintain the shape of the accordion.

In either implementation, the means and method as shown herein, with a few simple specialized parts, permit the conversion of an ordinary internal combustion engine, pump or compressor from a sliding-piston arrangement into the superior ball bearing movement detailed above.

What is claimed is:
1. A piston and cylinder comprising:
   (a) a piston having a plurality of circumferential slots;
   (b) a plurality of bearings seated in said slots to bear on said cylinder; and
   (c) a continuous accordion baffle being expansible and contractable longitudinally in said cylinder and defining an expansion chamber with the head of said cylinder.

2. Structure according to claim 1 wherein said baffle is substantially frustoconical to promote proper seating of accordion convolutions.

3. Structure according to claim 1 wherein said piston comprises an existing internal combustion engine piston and said slots comprise the sealing ring grooves and oil ring groove of said existing piston.

4. Structure according to claim 3 wherein said baffle has an end wall to bear against the top of said piston and at the opposite end thereof an outwardly extended radial flange to engage between the head of said cylinder and the cylinder-defining block.

5. A method of converting an internal combustion engine or pump device having a cylinder head, a cylinder, a piston operative in said cylinder and having circumferential grooves defined in the piston and seating rings in said grooves defining a sliding seal with said cylinder and defining a compression chamber above said piston, to a piston device using roller bearings, comprising the following steps;

(a) removing the cylinder head;
(b) removing the piston;
(c) inserting an expansible diaphram into said cylinder head from the head end thereof and sealing same with said head by the remounting thereof;
(d) removing the rings from said grooves in said piston;
(e) inserting roller bearings in said grooves; and
(f) replacing said pistons in said cylinder.

6. Structure according to claim 5 wherein said bearings are captured in split ring cages and step (d) comprises snapping said cages into said grooves.

7. Structure according to claim 5 wherein said diaphram comprises a two-ended frustoconical accordion-walled diaphram with an end wall defined at one end to bear against the top of said cylinder and a radial flange extending from the other end, and step (c) comprises inserting said accordion walled diaphram into said cylinder and capturing said flange between said head and said cylinder block.

* * * * *